US012684192B2

(12) United States Patent
Doolen

(10) Patent No.: US 12,684,192 B2
(45) Date of Patent: Jul. 14, 2026

(54) AUTOMATED GENERATION OF CONTENT-RELATED DISCUSSION

(71) Applicant: DISH Network L.L.C., Englewood, CO (US)

(72) Inventor: Abigail Doolen, Castle Pines, CO (US)

(73) Assignee: DISH Network L.L.C., Englewood, CO (US)

( * ) Notice: Subject to any disclaimer, the term of this patent is extended or adjusted under 35 U.S.C. 154(b) by 53 days.

(21) Appl. No.: 18/438,798

(22) Filed: Feb. 12, 2024

(65) Prior Publication Data

US 2025/0260861 A1    Aug. 14, 2025

(51) Int. Cl.
| | |
|---|---|
| *H04N 21/431* | (2011.01) |
| *H04N 21/234* | (2011.01) |
| *H04N 21/235* | (2011.01) |
| *H04N 21/266* | (2011.01) |

(52) U.S. Cl.
CPC ... *H04N 21/4316* (2013.01); *H04N 21/23418* (2013.01); *H04N 21/235* (2013.01); *H04N 21/26603* (2013.01)

(58) Field of Classification Search
CPC .................................................. H04N 21/4316
See application file for complete search history.

(56) References Cited

U.S. PATENT DOCUMENTS

| | | | | |
|---|---|---|---|---|
| 2010/0081120 A1* | 4/2010 | Nanjiani | ............... | H04L 67/131 |
| | | | | 434/322 |
| 2023/0177395 A1* | 6/2023 | Arbel | ................. | G06Q 30/0251 |
| | | | | 706/11 |
| 2025/0119625 A1* | 4/2025 | Bhattacharyya | ........ | G06F 40/30 |

* cited by examiner

*Primary Examiner* — Michael H Hong
(74) *Attorney, Agent, or Firm* — KW Law, LLP

(57) ABSTRACT

Systems, devices and automated processes are described for automatically generating discussion topics such as questions or the like that are related to particular media programs being watched by one or more viewers. The questions are generated by a large language model (LLM) or similar artificial intelligence (AI) construct executed by a content provider, by the viewer's device, or by another service. The automatically-generated questions can greatly improve the viewer's experience by provoking thought or discussion, and by fostering a community atmosphere related to the particular program being viewed.

11 Claims, 4 Drawing Sheets

AUTOMATED GENERATION OF CONTENT-RELATED DISCUSSION

TECHNICAL FIELD

The following generally relates to automated generation of discussion topics, questions or similar content related to television programs, movies or other media program content. Some implementations may make use of artificial intelligence (AI) constructs, as described herein.

BACKGROUND

Media consumption has undergone a remarkable evolution in recent years, transitioning from a collective family activity centered around the living room television set to a highly personalized experience that can be enjoyed across a multitude of devices and settings. In the bygone era, viewers were bound to programming schedules and limited media distribution, thereby constraining their television and movie watching to specific times and places. Now, with the proliferation of advanced streaming services and portable devices such as smartphones, tablets and laptops, individuals have the freedom to access a diverse range of media content anytime and anywhere.

The shift to on-demand viewing liberates users from the constraints of traditional broadcasting schedules and geographic limitations, offering unprecedented convenience and choice. The modern landscape of media consumption, bolstered by technologies like digital video recorders and streaming media, caters to the individual's preferences and provides a tailored viewing experience. This has made an extensive library of content more accessible than ever, eliminating the barriers of space and time that once limited viewing opportunities.

This transformation, however, has led to a more isolated viewing culture. The shared experience of watching and discussing media in a communal space is increasingly rare, as viewers can now engage with their preferred content by themselves, detached from the interactions that historically accompanied television time spent with family or friends. The spontaneous discussions and bonding moments that emerged from gathered viewing can be less frequent when personalized media consumption occurs in solitude.

As media content continues to expand and as technology advances, there is a growing need to reconcile the benefits of individualized viewing with the desire for community and shared experiences. While the convenience of accessing media in a personalized manner is undeniable, it also poses the risk of fragmenting the collective conversation and diminishing the social aspect of media engagement. Finding a balance between these two facets of modern media consumption is a challenge for content creators, technology developers, and viewers alike, who must navigate the trade-offs between personalization and community in the digital age.

A substantial desire therefore exists to build technology systems, devices and automated processes that allow for automatic generation and efficient sharing of discussion questions, conversation topics or the like that are related to particular media programs. These and other features are described in increasing detail below.

BRIEF DESCRIPTION

Systems, devices and automated processes are described to automatically generate discussion topics, questions and/or the like that can be presented to one or more viewers of a particular media program to provoke discussion or thought, and to foster a community environment centered around viewing of the particular program. Discussion topics may be automatically generated based upon the program content so that the topics are timely, relevant and customized to the particular program. Further discussion could be further customized in response to viewer feedback, a desire for follow-up, viewer demographics and/or other factors as desired. Various embodiments make use of a large language model (LLM) or other artificial intelligence (AI) engine that is capable of generating intelligent and timely discussion topics that are relevant to the particular viewer or viewers. After the AI engine is trained based upon the media content and/or its metadata, natural language queries can be posited to the engine to arrive at discussion topics that are timely, relevant and potentially customized to the viewer and/or viewing context.

In one particular example, an automated process is performed by a computer system such as a server computer associated with a content provider, or phone, tablet, computer, set top box or other device associated with a viewer of a media program. The computer system suitably comprises a processor, a non-transitory digital storage and an interface to a network. The automated process performed by the computer system suitably comprises: receiving metadata about a media program; automatically generating, by the computer system, one or more discussion topics related to the media program based upon the metadata; and providing the automatically-generated discussion topics for presentation to a viewer while the viewer is watching the media program on a viewer device. In some implementations, the computer system further executes an LLM or other AI model that has been trained on information about the particular media program, such as its timed text and/or any other information available, so that the AI model is able to generate relevant discussion topics in response to received natural language queries or the like.

In another example, an automated process is performed by a computer system comprising a processor, a non-transitory digital storage and an interface to a network. The automated process suitably comprises: receiving metadata about a media program to be watched by a viewer operating a remotely-located viewer device; providing at least some of the metadata about the media program to thereby train a large language model (LLM) about the media program; subsequently receiving, from the remotely-located viewer device, an indication that the viewer is watching the media program; in response to the indication, formulating a natural language query based upon the metadata and placing the natural language query to the LLM to thereby automatically generate one or more discussion topics related to the media program based upon the previously-received metadata; and providing the automatically-generated one or more discussion topics for presentation to a viewer while the viewer is watching the media program on the remotely-located viewer device. The LLM may be trained about the media program by converting at least some of the metadata to mathematical vectors. The vectors may be stored for subsequent processing of natural-language or other queries to generate topics of interest based upon the initially-received metadata.

Another embodiment relates to a computer system comprising a processor, a non-transitory digital storage and an interface to a network. The non-transitory digital storage comprises computer-executable instructions that, when executed by the processor, perform an automated process that comprises: receiving metadata about a media program to be watched by a viewer operating a remotely-located viewer device; automatically generating, by the computer system based upon the received metadata, one or more discussion topics related to the media program; and providing the automatically-generated one or more discussion topics for presentation to a viewer while the viewer is watching the media program on a viewer device.

Still other embodiments relate to a data processing system that comprises an input interface, a question generation engine implemented with a digital processor, and a network interface. The input interface is configured to receive metadata about a media program that is to be presented to a viewer operating a remotely-located media device. The question generation engine is configured to automatically generate one or more discussion topics related to the media program based upon the received metadata. The network interface is configured to communicate with the remotely-located media device and thereby provide the automatically-generated one or more discussion topics to the remotely-located media device for presentation to a viewer while the viewer is watching the media program.

Additional embodiments provide other systems, devices, computing systems and automated processes substantially as described herein, and/or their legal equivalents.

DETAILED DESCRIPTION

Figure 1:
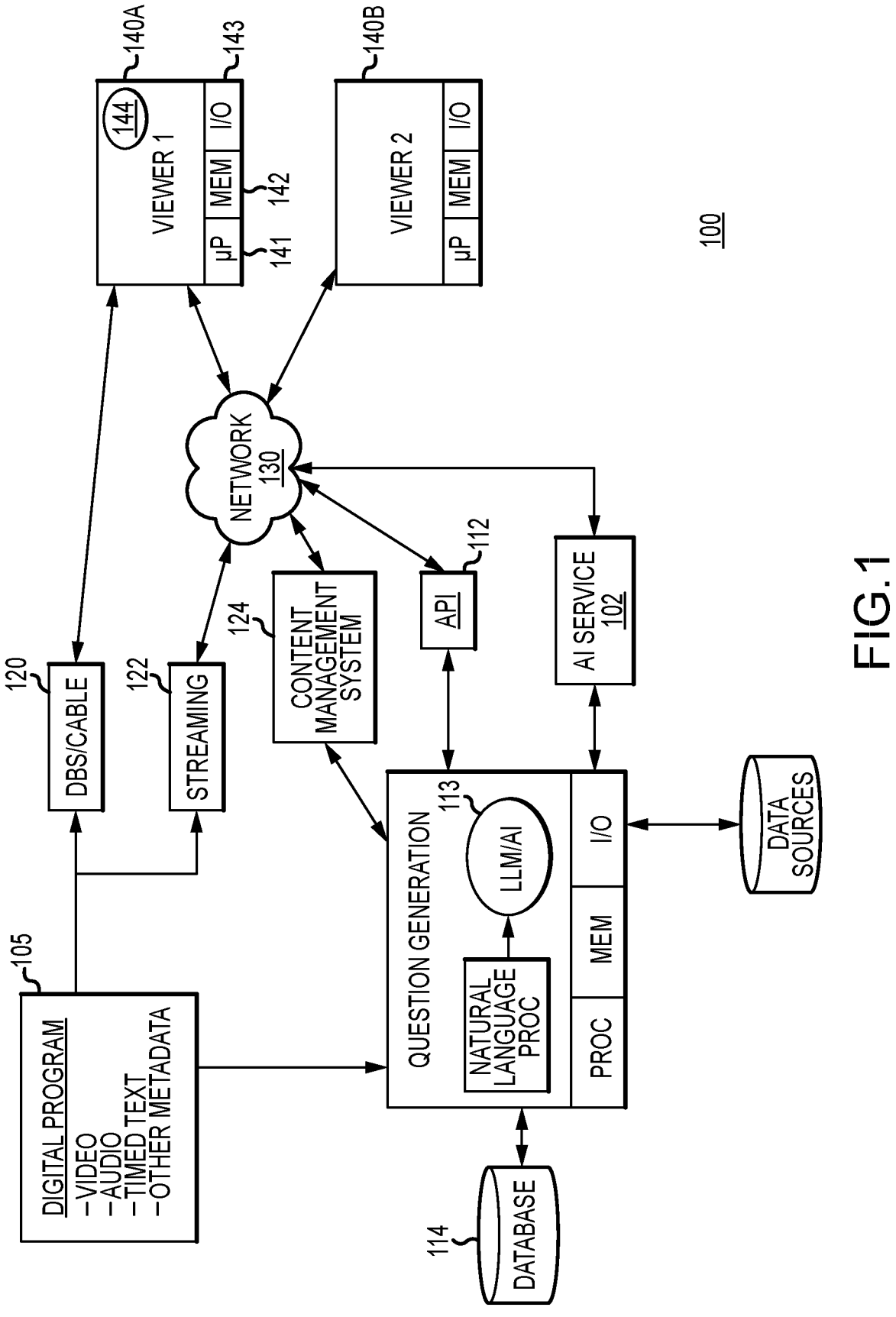
FIG. 1 illustrates an example data processing system for automated generation and distribution of discussion topics relating to media programs.

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, the media viewing experience is greatly improved by providing automatically-generated questions or other topics for discussion. These automatically-generated topics can be provided on a display while the viewer is enjoying a program, if desired. Alternatively, topics can be provided in a "second screen" or other companion device such as a phone, tablet, computer or other web-browsing device, either as the viewer is watching the program or at another time. Viewers may be allowed to provide answers to the topics, if desired, that can be provided to other users and/or used to generate follow-up messages that provoke even further discussion. Automatically-generated topics can provoke thought or discussion related to the particular program, even if other humans are not physically present at the place and time that the program is being viewed. Further, the automatically-generated questions can be used to foster discussion and interaction between family members, friends, coworkers and/or other people who are viewing the same program, even if the viewings take place at different times or places.

Questions or topics of discussion can be generated in any manner. In various embodiments, a locally-executing or remotely-available artificial intelligence (AI) agent can be prompted with a natural language query to generate relevant information. The AI agent may be trained on metadata about the program, if desired, including actual program content (e.g., timed text, audio and/or video content). Alternatively or additionally, the AI agent may obtain information about the identified program from public or private databases, crowdsourced data and/or any other source. Automatically-generated content can be educational, if desired, or can simply provoke relevant discussion amongst peers. By providing relevant and timely points of discussion, the automatically-generated content can foster a community of viewership while also enhancing the enjoyment of the viewing experience.

To that end, various embodiments make use of large language models (LLMs) or similar artificial intelligence constructs. The artificial intelligence capabilities may be executed by a server system associated with a content provider, by a viewer-associated device (e.g., a phone, tablet or computer), and/or by a network service accessible to the content provider and/or the viewer device. In some implementations, the trained AI will receive a natural language query that is unique to the relevant program (e.g., "What are some questions for discussion of media program X?"). The natural language queries may be further enhanced with viewer information (e.g., "What are some questions for discussion by teenagers of media program X?", or "What are some questions for discussion by people who are not familiar with the main character?"), with details about the program (e.g., "What are some questions for discussion after viewing seventeen minutes of media program X?"). Other embodiments may generate more sophisticated queries using any number of factors, as described more fully herein.

Turning now to the drawing figures and with initial reference to FIG. 1, an example system 100 to automatically generate relevant topics related to a particular media program suitably includes a question generation engine 110 that formats natural language queries based upon information about a media program to arrive at machine-generated discussion topics or questions. Automatically-generated questions may be delivered to any number of media viewer devices 140A-B via a content management system (CMS) 124, via an application program interface (API) 112, or with the content itself as desired.

Discussion topics can be generated in any manner, based upon any available information about the particular media program. In various embodiments, a large language model (or similar AI construct) 113 executes within the question generation engine 110 to process queries that result in automatically-generated topics. Alternatively, question generation engine 110 formats natural language queries that can be posited to commercial databases, public databases or other data sources 102, 104 via the Internet or another network 130. Formatted queries and any answers received from the AI 113 can be stored in a database 114 for subsequent retrieval and further processing, if desired.

Digital content 105 may be received and delivered in any manner. In various embodiments, digital content 105 is received via network 130, via terrestrial or satellite broadcast, or in any other manner. Content 105 typically includes a multiplex of digital streams that are synchronized in time to represent a particular television program, movie or other media program. An MPEG multiplex, for example, typically represents a media program with one or more video streams, one or more audio streams, one or more timed text streams and associated metadata that encodes the content of the particular program 105. Generally speaking, the various component streams of the multiplex are synchronized by common timing data, such as a presentation time stamp (PTS), so that content from the various video, audio and timed text streams can be presented in synchrony to the viewer.

In some implementations, system 100 delivers content 105 to the various viewer devices 140A-B for playback. FIG. 1 illustrates a digital broadcast satellite (DBS) or cable connection 120 that provides a broadcast of the content, along with a video streaming system 122 that provides an over the top (OTT), IPTV or other video stream. Although FIG. 1 illustrates both broadcast and streaming media delivery services, it is not necessary that system 100 include both, or either, of these distribution schemes. Other embodiments could deliver content 105 via any other broadcast or streaming services, as desired. Further, it is possible to deliver automatically-generated discussion points separate from the content; that is, the generated discussion points could be delivered by a service 100 that is separate from the delivery of the underlying content 105, if desired.

Viewers can enjoy their media program content, along with any automatically-generated questions or discussion points, in any manner. In the example of FIG. 1, viewers make use of hardware devices 140A-B such as set top boxes (STBs), smart televisions, video streaming devices, personal computers, mobile phones, tablets and/or the like. Different viewers may make use of different types of devices 140A-B, each having computing hardware such as a processor 141, memory or other non-transitory digital storage 142 and suitable input-output interfaces 143, as desired. In the example of FIG. 1, the viewer controls his or her device 140 to select and view media programs 105, to receive discussion questions from system 100, and to provide responses to system 100 via API 112 on network 130. Other embodiments could split the media viewing and question handling processes across two or more devices 140, if desired. A viewer may watch a program 105 on a regular television set, for example, while simultaneously interacting with the automatically-generated discussion topics on a tablet, phone or personal computer.

Question generation engine (QGE) 110 operates in any manner. In the example of FIG. 1, QGE 110 executes using conventional computing hardware such as one or more processors 117, non-transitory digital storage 118, and any appropriate input/output interfaces 118. Equivalent embodiments may make use of cloud-based computing resources such as the virtual machine architectures provided by Amazon Web Services (AWS), Microsoft Azure, Google Cloud, IBM Cloud, and/or the like.

QCE 110 processes available data and/or interacts with other services to generate the discussion questions and topics referenced herein. In one example, GCE 110 supports a large language or other AI model 113 that is trained upon data relating to media programs 105. The data may include actual program content, such as the audio content or the timed text content, as appropriate. Audio content may be analyzed after performing a speech-to-text conversion, as desired. Similarly, video content may be analyzed using a computer vision tool to analyze visual elements that can add understanding the context (e.g., scene changes, key actions) if desired. Examples of such tools could include the Open Computer Vision Library (OpenCV), the TensorFlow tools available from Google Inc, and/or any number of other tools desired.

In many implementations, the timed text stream of program 105 will provide a detailed summary of the program contents, along with convenient timing information from the presentation time stamps or other timing data. The text may be analyzed to recognize characters, scenes and other attributes of the media program. In addition or as an alternative to content derived from the program itself, the AI model 113 may be additionally or alternately trained on additional metadata, or information about the program, that is available from data sources 104, such as any public database (e.g., Wikipedia), private database (e.g., the GRACENOTE media database service available from Gracenote, Inc. of Emeryville, California or the IMDB service maintained by Amazon Inc. of Seattle, Washington), and/or the like. In some implementations, metadata, program content and/or any other data used to train the model may be provided to an AI framework that converts the received data to mathematical vectors that can be stored in a database for further processing and retrieval. Vectors may be stored in database 114, if desired, and/or in a separate database that is formatted for use by AI 113.

Network AI services 102 could also be used to obtain content or to assist in generating discussion content, as desired. Examples of current AI services 102 include, without limitation, the ChatGPT service available from OpenAI, the Bard service available from Google, the MetaAI service available from Meta Inc., the Watson service available from IBM Corp., just to provide a few examples. Additional AI services are being deployed rapidly, and any of these services could be equivalently used, if desired.

In one example, QGE 110 deploys a Large Language Model (LLM) or similar AI model 113 for automatically generating discussion points about digital content 105. This AI 113 is trained using a dataset that includes data such as the timed text (e.g., subtitles or captions) associated with the digital content 105, as supplemented with data obtained from various web sources 104. Additional data could include the title of the program, the names of actors and actresses appearing in the program, professional or amateur reviews or commentary, awards won by the program, and any other information as desired. The inclusion of external web data can enhance the model's comprehension and contextual relevance, making it more effective in understanding and interacting with the content. Further, the use of additional data 104 is particularly useful when there are gaps in the primary training dataset or when more diverse inputs are required to enhance the model's accuracy and effectiveness. As noted above, any received data can be provided to the LLM to generate sets of vectors that can be stored for use in subsequent analysis, including responses to natural language queries.

The architecture of the AI 113 can be designed to be flexible, and to adapt to one or more existing frameworks if desired. These frameworks provide the foundational structure and learning algorithms for the LLM and may also provide resources for "training" custom models by converting input data to mathematical vectors or the like. Frameworks such as LLAMA from Meta Corporation, ChatGPT from OpenAI, and BARD from Google Inc. could be used, for example, to provide just a few examples of the many different frameworks that could be equivalently used. Custom-built AI frameworks could also be employed that are tailored to specific needs or objectives. Each of these frameworks has its unique strengths and methodologies, making them suitable for different aspects of language processing and learning.

In various embodiments, a natural language processing (NLP) module 115 allows for natural language queries to be placed to the AI 113 to generate the discussion topics based upon relevant information. Some generated topics may relate to general concepts (e.g., "Did you enjoy this program?", "Which character did you most relate to?", "How did the ending make you feel?"), if desired. In some embodiments, however, questions and topics can be placed with additional reference to particular viewer's attributes (e.g., questions could be tailored based upon gender, geographic location, age or any number of other factors). Still further embodiments could generate different questions based upon the viewer's playback point in the program, thereby provoking discussion or thought as the program progresses, but without providing spoilers or other information about later points in the program. Again, questions can be tailored as desired so that they are specific to the program, as well as the viewer and the viewing position in the program.

The AI 113 and/or network AI service 102 process received queries in any manner to produce the requested topics. In various embodiments, the AI engine provides a framework for parsing the natural language query and for searching the vector space of generated vectors to arrive at suitable results. Other AI engines and implementations could operate in any other manner, using any sorts of mathematical, statistical, data processing and/or other features to implement the AI model. Results can be digitally returned in response to the received queries via a network, via an inter-process or bus communication within data processing system QGE 110, and/or in any other manner.

Generated questions, discussion topics and the like are provided to the viewer device 140A-B in any manner. In one example, media client applications 144 executed by viewer devices 140A-B communicate with the content management system 124 to provide digital updates about the viewing experience, including content requested, content viewed and/or the like. Content management system 124 may also be involved with ad replacement or tracking, or other viewer experiences as desired. An example of a content management system that is used to track ad viewing within an adaptive media streaming environment is described in U.S. Pat. No. 11,463,785 (incorporated herein by reference), although other types of content management systems could be used in other embodiments. Such systems could be modified to distribute discussion topics and other data, if desired.

In one example, content management system 124 appropriately obtains digital discussion topics about the currently-viewed program from QGE 110 and/or database 114. Received topics are then forwarded to the viewer devices 140 as appropriate. Alternatively, the viewer devices 140A-B may communicate with QGE 110 and/or database 114 via API 112, as desired. Discussion topics may be digitally presented to the viewer, and any responses may be obtained via API 112 for storage in database 114 and/or further processing, as desired.

Figure 2:
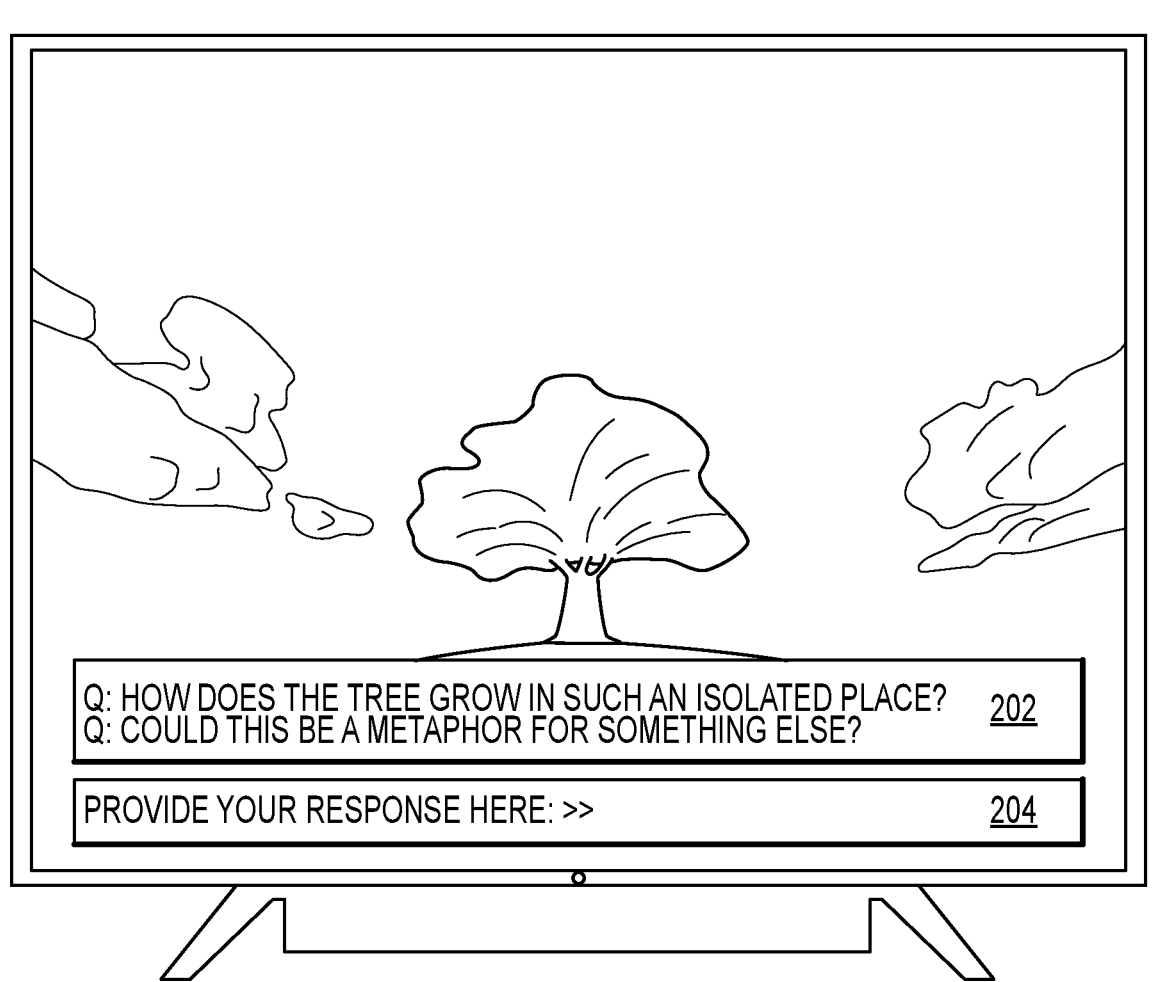
FIG. 2 illustrates an example display in which automatically-generated topics about a particular media program are provided to a viewer in conjunction with the media program.

FIG. 2 illustrates one example of an interface 200 that includes both video content 202 and discussion topics 204 in the form of questions. This example also includes a text entry field 206 for the viewer to enter responses to the topics presented in window 204. This example illustrates the relevance of the generated topics while the viewer is enjoying the selected program, and demonstrates the real-time (or near real-time) availability of discussion materials. Other embodiments could alternately present the generated topics in any other manner, or in less than real-time, if desired. Questions or other topics could be presented, e.g., as an overlay on the rendered video imagery instead of in a separate window if desired. The windows could be arranged in other ways, if desired: the discussion questions could be generated in a window that is side-by-side with rendered imagery, for example, that scrolls as the content progresses. Still other embodiments could provide the automatically-generated topics and any received viewer inputs in a completely separate window, if desired. Even further, topics and responses could be presented on a separate device. If a viewer is enjoying program content 105 on a television screen, for example, automatically-generated questions could be presented via a companion application executing on a smartphone, tablet or other device. Timing could be coordinated between the two devices by sharing PTS or other playback timing data (e.g., via CMS 124) from the playback of the media program, thereby ensuring that discussion questions are not presented to the second device until the relevant playback point in the program 105 has been reached. Other embodiments may be formulated to permit convenient media playback, question/topic presentation and viewer responses, as desired.

Figure 3:
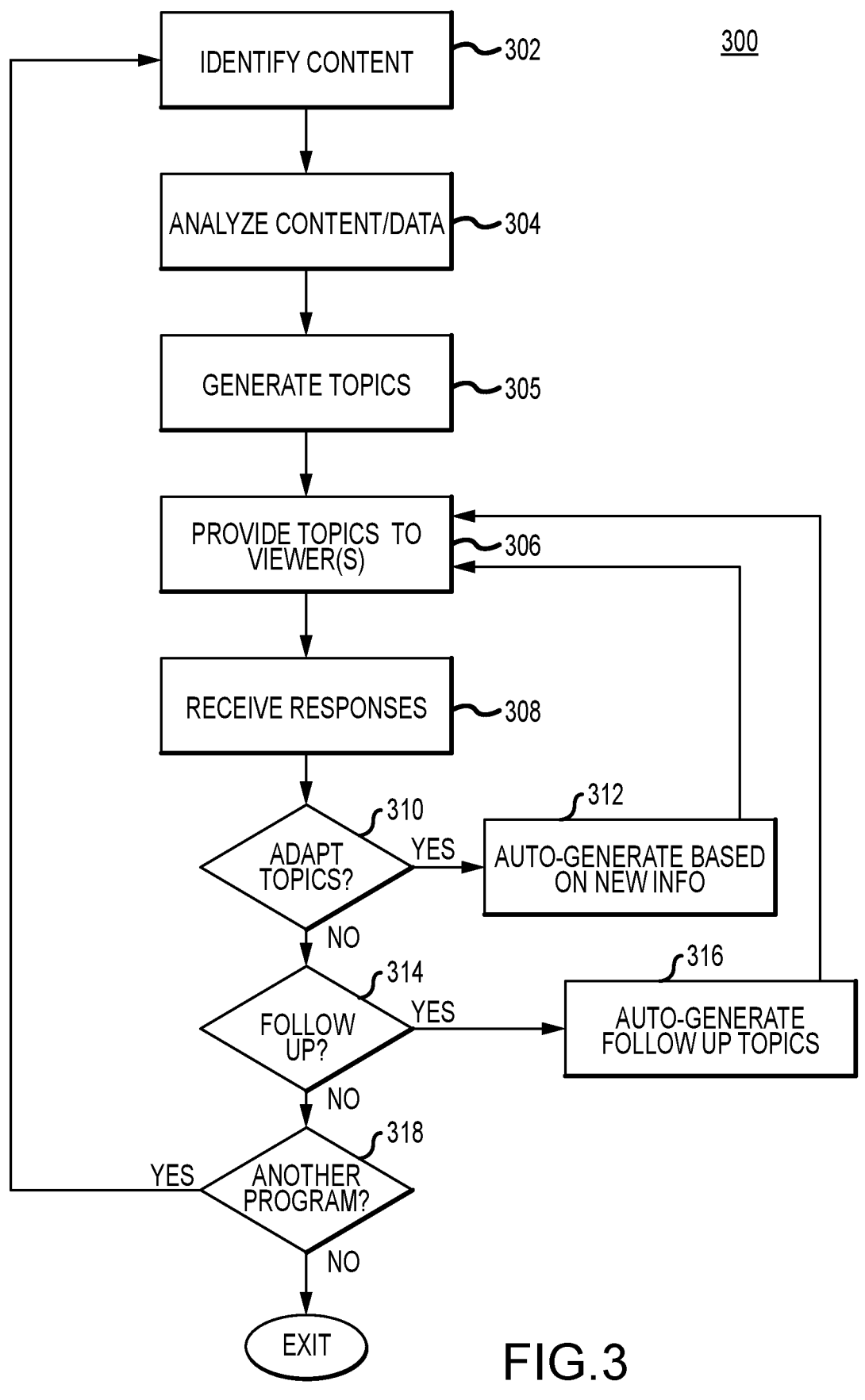
FIG. 3 illustrates an example of an automated process to automatically generate discussion topics about a particular media program.

FIG. 3 is a flowchart of an example process 300 to manage the automatic generation of discussion topics in a media viewing system 100. The various functions of process 300 may be performed using processor 116 executing software, firmware or other programmable logic, as augmented by the other components of system 100. Other embodiments may divide processing between the various components of system 100, including viewer devices 140A-B, as desired. In some implementations, a media application 144 could contain an AI model or other construct that has been trained on various media programs so that some or all of the topic generation could be handled locally on device 140A-B, thereby reducing processing demands on QGS 110. In this instance, media application 144 could interact with QGS 110 and/or another AI service 102 to supplement the local processing capability, if desired. In a further embodiment, an AI executing locally on viewer device 140 obtains initial discussion points from QGS 110 and/or AI services 102 but generates follow up discussion or additional details using a locally-executed model. To that end, topics generated by AI elements executing on viewer device 140, QGE 110 and networked services 102 could be combined in any manner.

With reference now to FIG. 3, an example of an automated process 300 suitably includes the broad functions of receiving information about one or more media programs 105 (function 302), automatically generating one or more discussion topics about the media program based upon the information received (function 304), and providing the automatically-generated topics for presentation to the viewer while the viewer is watching the media program 105 on a viewer device 140A-B (function 306). These broad functions may be supplemented, combined and/or otherwise modified in any manner. Discussion topics may adapted, for example, based upon viewer feedback, viewer attributes, and/or the like.

In some implementations, process 300 may be executed in real-time (or near real-time, recognizing some delays inherent in data processing, digital communications and the like). That is, automatically-generated questions or topics could be created in real time in response to a request from a viewer, or in response to a viewer's interaction with a particular media program. This would permit highly customized topics to be generated based upon the viewer's attributes, viewing history, and the like. Other embodiments could permit questions to be generated prior to viewing, with the generated content being stored (e.g., in database 114) until needed by the viewer. Still other embodiments could combine these approaches by permitting some questions to be generated in advance, with additional discussion generated in response to the viewer's answers, or the like.

As noted above, program content 105 may be processed in any manner (function 302). In various embodiments, viewer device 140 identifies a program of interest via the content management system 124. The program could be a currently viewed program, for example, or a program in a playlist or the like. In still other embodiments, certain programs 105 may be selected for analysis even before the particular viewer selects the program to improve response times. In this example, the LLM can be trained on the program content, and/or sample questions or topics can be generated for storage and subsequent use.

Program metadata can be analyzed in any manner (function 304) to train the AI model 113. Some implementations may analyze portions of the content itself (e.g., timed text, audio content via voice-to-text conversion, and/or video content via automated scene analysis) as described above. AI 113 may be trained based upon dialog and scene changes of the program, for example, to learn about the program content and to determine timing information so that the various scenes in the program can be referenced with regard to a viewer's playback point in the program, if desired. Additionally and/or alternatively, other information about the program 105 may be used to train AI 113 so that further context or detail can be learned. Other information could include any sort of information from public or private databases, as noted above, as well as any external AI services that may be available, as desired. "Metadata" about the program, then, could include portions of the program itself (e.g., timed text) in addition to or as an alternative to other information about the media program that is available from other sources 104. Training the AI could involve any process or technique by which the AI 113 becomes aware of the input data. As noted above, the AI may provide a framework or ingestion engine that receives input data that is then converted to mathematical vectors or the like for storage and subsequent processing. Data may be tagged, if desired, to permit more efficient recognition and conversion to digital format. Other embodiments may intake and analyze the received data in any other way.

In many embodiments, the discussion questions/topics can be obtained from the AI 113 (and/or AI service 102) by placing a natural language query (function 305). To that end, QGE 110 and/or application 144 suitably includes logic 115 for formatting natural language queries that can produce useful results from the trained AI 113. As noted above, queries may consider the viewer's demographic information, viewing history or preferences, previous responses and/or the like in generating specific queries to the AI 113. Formatted queries can be provided to any trained AI model to receive automatically-generated results. Queries can be placed to AI 113 or the like that has been trained on the specific program 105, for example, to obtain customized results.

Still further embodiments may posit queries to both a local AI service 113 and to a network AI service 102 to obtain additional information, for redundancy, and/or for any other purpose. Queries may be simultaneously placed, if desired, or queries could be staggered so that one service provides different information (e.g., "filling in the gaps") in the information received from the other service. Again, functions could be shared and/or intermixed between local and remote AI engines 113 and 102 in any manner. For example, it may not be necessary to train AI 113 on every program 105. Some commercially available AI services 102 may already be trained on certain media programs 105 (e.g., more popular movies), for example, so those services could be queried as appropriate for information that is within their knowledge base, without the need to duplicate that knowledge locally. Still further embodiments could obtain a "first draft" of discussion materials from an external AI 102, with a locally-executing AI 113 providing more detailed context, as well as an added layer of viewer anonymity, if desired. Other hybrid scenarios could be formulated to use local and/or remote AI resources in any manner.

Automatically-generated discussion materials can be provided to the viewer in any manner (function 306). If the topics are generated locally on the viewer device 140, for example, questions could be provided on a display via an interface 200 as discussed above. If the questions are generated by a QGE 110, the results could be provided to the viewer's device 140 and/or to a companion device also associated with the viewer via the content management system 124 and/or via API 112. In one example, API 112 provides a secure hypertext transport protocol (HTTP) interface that interacts with client application 144 to request and receive automatically-generated discussion materials, although other embodiments could transfer the materials in other ways.

Similarly, various embodiments allow the viewer to submit answers to discussion topics and/or other feedback (function 308). Responses may be provided via API 112, for example, in response to viewer inputs received via interfaces 200 associated with client application 144. Viewer responses could be used to adapt topics used for future viewers, if desired (function 310), so that subsequent questions are better able to avoid ambiguities or better able to capture meaningful viewer responses (function 312). To that end, viewer responses may be stored in database 114 or the like, or may be provided to enhance the training of AI 113, as desired.

Various embodiments could also use viewer responses to generate follow-up discussion points, if desired (function 314). The follow up discussion could address ambiguities in the viewer's response, and/or could provoke deeper thought or discussion as desired. Follow-up topics could be generated by AI 113, if desired, based upon the viewer's responses (function 316).

As noted above, some portions of process 300 could be executed in advance of actual viewing, thereby permitting the generation and storage of discussion topics for multiple programs 105 on an a priori basis (function 318). Training of the AI 113 will typically occur in advance of question-generation to permit AI 113 to learn as much about the program 105 as possible. Topics can be generated in advance of viewing, if desired, and stored in database 114 until needed. This a priori processing could be augmented with real-time follow up, if desired, thereby improving the viewer experience as well as the efficiency of the entire system.

Figure 4:
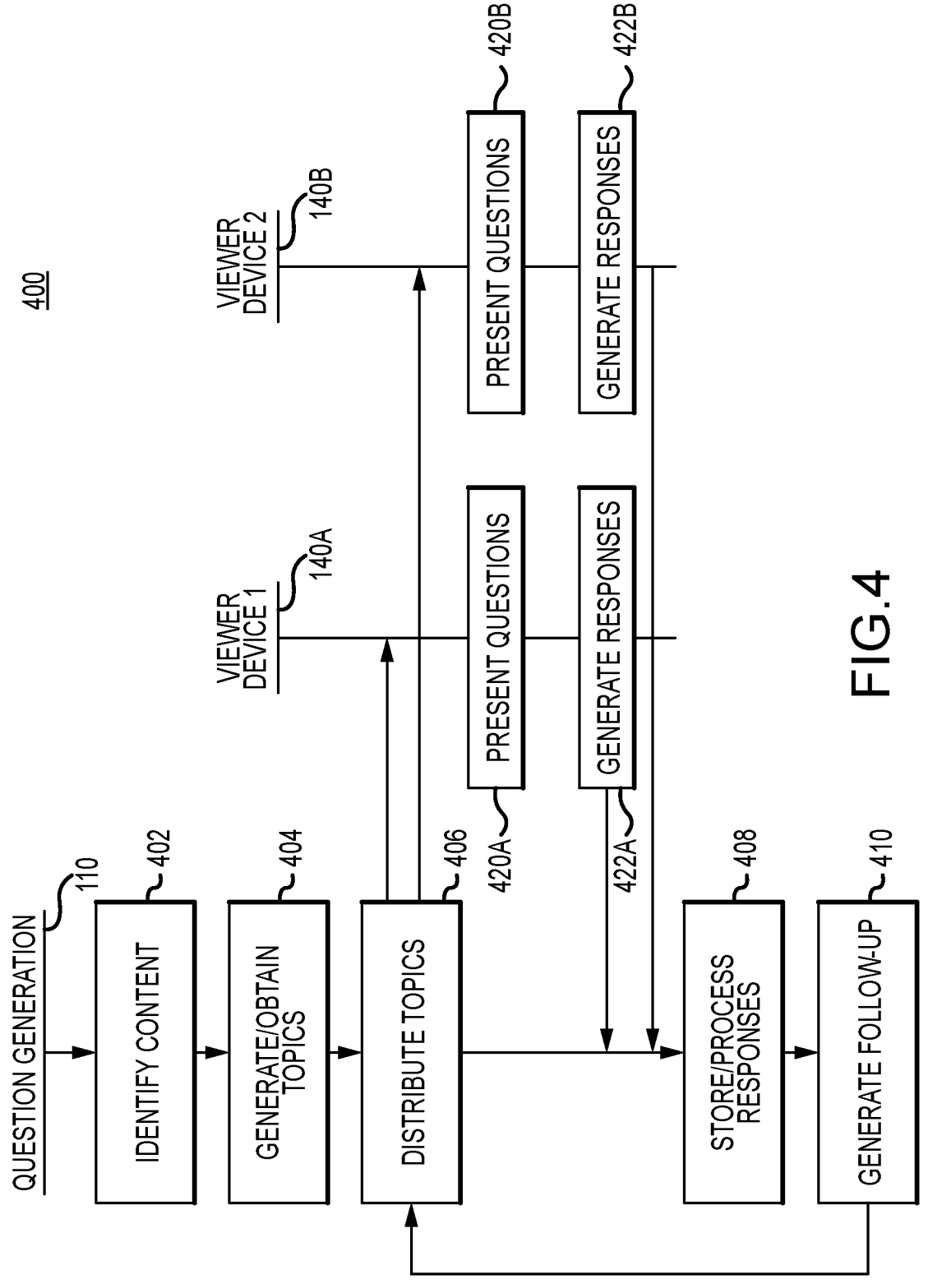
FIG. 4 illustrates an example of an interactive process performed by a data processing system in which automatically-generated discussion topics are presented to multiple viewers and dynamically adapted based upon viewer answers or other feedback.

FIG. 4 describes an automated process 400 for distributing automatically-generated discussion topics to one or more viewer devices 140A-B. Although FIG. 4 shows two viewer devices 140A-B, other embodiments could be built to support any number of different devices 140, as desired. The various functions shown in FIG. 4 could be performed by programmed logic executed by QGE 110 in conjunction with the other elements of system 100, including viewer devices 140.

As noted above, media programs 105 may be identified in any manner (function 402). In various embodiments, GCE 110 receives a notification that one or more viewer devices 140A-B are engaged with a particular program 105 from the content management system 144. Programs 105 may be identified by a program identifier, if desired, or by any other identifying information (e.g., title, channel, network, date and time, etc.).

Discussion topics are automatically generated in any manner (function 404). As noted above, questions may be generated in real time by an AI 113 that has been trained on the program content, if desired. Real time generation will typically permit more customized topics based upon information about the viewer, if desired. Real time generation may also permit faster response to live programs (e.g., sporting events, news programming or like), provided that AI 113 has been sufficiently trained on the live content (e.g., by considering a timed text stream). Alternatively, discussion topics can be generated in advance of viewing for storage in database 114. In either case, discussion topics can be generated in response to natural language queries placed to the AI 113, AI 102, and/or the like.

Automatically-generated questions can be stored for later reuse, if desired, and/or distribution to one or more viewer devices 140A-B that are currently presenting (or just presented) the relevant program 105 (function 406). As noted above, questions may be distributed to a media player application 144 via API 112, via content management system 124, or in any other manner. In still other embodiments, some or all of the generated topics could be distributed with the broadcast of the program itself (e.g., as part of the metadata associated with an MPEG multiplex), or in any other manner.

The example illustrated in FIG. 4 shows the generated topics being forwarded to multiple viewer devices 140A-B, but other embodiments may make use of different timing schemes. Topics that are tied to PTS or other timing data may be delivered as the viewer encounters that portion of the program, for example. In some implementations, questions and/or responses may be shared between multiple viewer devices 140A-B that are both showing the same program 105. Questions and/or responses may be shared with the multiple devices 140 simultaneously, if appropriate (e.g., if the viewers are watching the same live broadcast). Alternatively, questions or responses may be tagged with PTS or other timing information so that a viewer of one device 140A does not see questions or responses relating to upcoming scenes that have been viewed on a different viewer device 140B, thereby avoiding "spoilers" or other information that is not relevant to the particular viewer.

Automatically-generated topics can be presented by the viewing devices 140A-B in any manner (functions 420A-B). Topics may be displayed within an interface 200 generated by media client application 144, for example, or on a second screen as described above. Any responses from viewers may be similarly captured by viewer devices 140A-B and transmitted back to QGE 110 as desired (function 422A-B). As noted above, topics and any responses may be communicated via API 112, CMS 124, and/or the like.

Responses received by QGE 110 can be stored in database 114 or the like for further processing as desired (function 408). Responses may be used to generate follow-up questions (function 410), if desired, or for any other purpose. If follow-up questions are generated, these can be transmitted to the relevant viewer devices 140A-B as appropriate.

The general structures shown in FIG. 4 could be used to implement a virtualized discussion group that combines commentary from human viewers and an AI moderator, if desired. Comments about the program 105 from different viewers could be shared amongst different viewer devices 140A-B, with any delays inserted to coordinate timing with each viewer's playback position, if desired. By facilitating discussion amongst the AI 113 and different viewers, the AI a feeling of community can be generated that would not be possible from isolated viewership. AI-generated discussion topics can also provide a more educational experience from television viewing, if desired, thereby enhancing the value of the media content 105, and the distribution service or other entity that facilitates the automatically-generated discussion.

Benefits, other advantages, and solutions to problems have been described herein with regard to specific embodiments. Furthermore, the connecting lines shown in the various figures contained herein are intended to represent example functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by a computer system comprising a processor, a non-transitory digital storage and an interface to a network, the automated process comprising:

receiving metadata about a media program to be watched by a viewer operating a remotely-located viewer device;

providing at least some of the metadata about the media program to thereby train a large language model (LLM) about the media program;

subsequently receiving, from the remotely-located viewer device, an indication that the viewer is watching the media program;

in response to the indication that the viewer is watching the media program, formulating a natural language query based upon the metadata and placing the natural language query to the LLM and thereby instruct the LLM to create one or more automatically-generated discussion topics related to the media program, wherein the LLM responsively creates the one or more automatically-created discussion topics for the viewer in real time based upon the previously-received metadata about the media program; and providing the automatically-generated one or more discussion topics for presentation to a viewer while the viewer is watching the media program on the remotely-located viewer device.

2. The automated process of claim 1 wherein the LLM is trained about content of the media program by converting at least some of the metadata to mathematical vectors, the content of the media program comprising characters and plot elements occurring in the media program.

3. The automated process of claim 1 wherein the LLM executes on a processor associated with a question generation engine that communicates with the viewer device via a network.

4. The automated process of claim 1 wherein the indication comprises timing information describing a viewing point in the media program that has been viewed by the viewer, and wherein the natural language query instructs the LLM to consider the timing information in responsively creating the one or more discussion questions so that the one or more discussion questions relate only to characters and plot events occurring in the content of the media program that has been viewed by the viewer up to the viewing point in the media program.

5. The automated process of claim 2 wherein the metadata comprises timed text related to the content of the media program, and wherein the automated processing comprises analyzing the timed text related to the media program to thereby identify characters and plot elements of the media program for training the LLM.

6. The automated process of claim 2 wherein the metadata comprises audio content related to the media program, and wherein the automated processing comprises performing a speech-to-text conversion on the audio content and analyzing the resulting text related to the media program to thereby identify characters and plot elements of the media program for training the LLM.

7. A data processing system comprising:

an input interface configured to receive metadata about a media program that is to be presented to a viewer operating a remotely-located media device;

a question generation engine implemented with a processor of the data processing system, the question generation engine configured to:

receive, from the remotely-located viewer device via a network, a natural language query comprising an indication that the viewer is watching the media program; and place the received natural language query to a large language model (LLM) and thereby instruct the LLM to create one or more automatically-generated discussion topics related to the media program, wherein the LLM responsively creates the one or more automatically-created discussion topics for the viewer in real time based upon the previously-received metadata about the media program; and a network interface to communicate with the remotely-located media device and thereby provide the automatically-generated one or more discussion topics to the remotely-located media device for presentation to a viewer while the viewer is watching the media program.

8. The data processing system of claim 7 wherein the large language model (LLM) of the question generation engine is trained on the metadata about the media program and configured to generate the one or more discussion topics based upon characters and plot events of the media program described by the metadata.

9. The data processing system of claim 7 wherein the natural language query received from the remotely-located viewer device comprises timing information describing a viewing point in the media program that has been viewed by the viewer, and wherein the natural language query instructs the LLM to consider the timing information in responsively creating the one or more discussion questions so that the one or more discussion questions relate only to characters and plot events that have occurred in the content of the media program that has been viewed by the viewer prior to the viewing point in the media program.

10. The data processing system of claim 8 wherein the network interface is further configured to receive a viewer response to the one or more discussion topics, wherein the question generation engine is further configured to responsively create one or more follow up discussion topics based upon the characters and the plot events of the media program and the viewer response, and wherein the network interface is further configured to provide the one or more follow up discussion topics to the remotely-located media device for presentation to the viewer.

11. The data processing system of claim 10 wherein the natural language query received from the remotely-located viewer device comprises timing information describing a viewing point in the media program that has been viewed by the viewer, and wherein the natural language query instructs the LLM to consider the timing information in responsively creating the one or more discussion questions so that the one or more discussion questions relate only to characters and plot events that have occurred in the content of the media program that has been viewed by the viewer prior to the viewing point in the media program.

* * * * *